(No Model.)
J. C. BROWN.
MASTER KEY FOR NUT LOCKS.
No. 524,084. Patented Aug. 7, 1894.
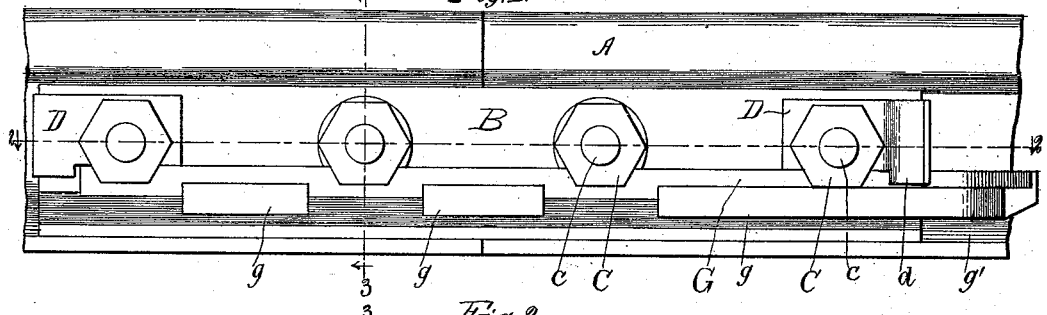
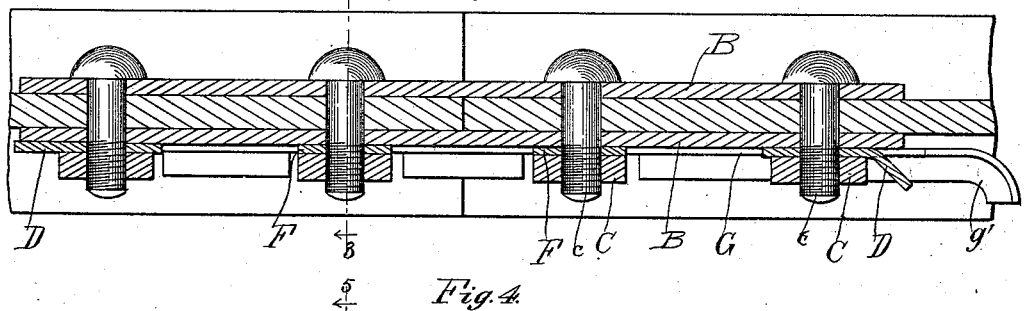
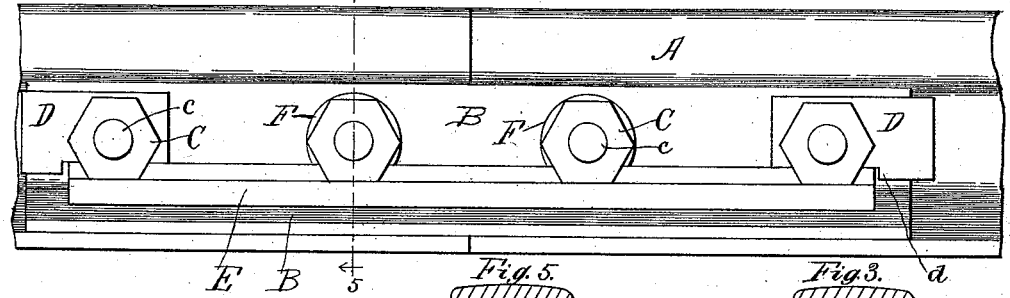
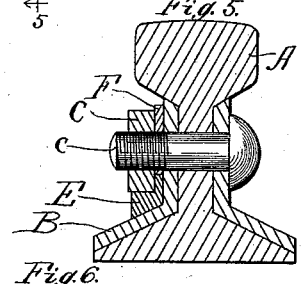
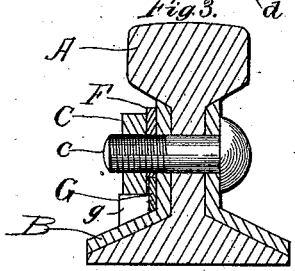
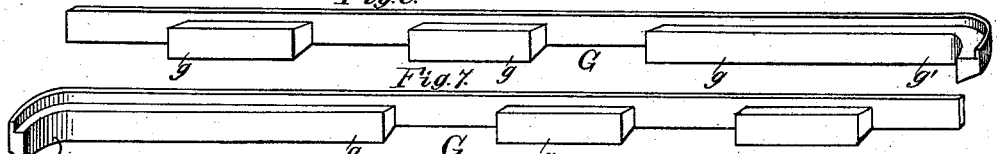
Witnesses:
Rudolph Wm Lutz
Steuart Ward
Inventor:
Julius C. Brown
By Louis K. Gillson
Attorney.
THE NORRIS PETERS CO., PHOTO-LITHO., WASHINGTON, D. C.

UNITED STATES PATENT OFFICE.

JULIUS C. BROWN, OF SANTA BARBARA, CALIFORNIA.

MASTER-KEY FOR NUT-LOCKS.

SPECIFICATION forming part of Letters Patent No. 524,084, dated August 7, 1894.

Application filed May 21, 1894. Serial No. 511,939. (No model.)

*To all whom it may concern:*

Be it known that I, JULIUS C. BROWN, a citizen of the United States, residing at Santa Barbara, in the county of Santa Barbara and State of California, have invented certain new and useful Improvements in Master-Keys for Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a master or set key for use in railroad building. Its object is to provide a removable key for use in applying the bolts and nuts to fish plates and for the purpose of securing the proper position of the washers used under the nuts, so that a locking key may be inserted under and behind the nuts after they have been turned up.

The invention consists of a metal bar, angular in form in cross section so that it will lie in the angle of the fish plate, its vertical leaf being behind the nuts and its lower leaf being cut away or recessed so that the nuts may be turned.

In the drawings: Figure 1, is a side elevation of a portion of railway track with the key in use. Fig. 2, is a plan section on the line 2—2 of Fig. 1. Fig. 3, is a transverse section on the line 3—3 shown on Figs. 1 and 2. Fig. 4, is a similar view to Fig. 1, the locking key having been substituted for the master key. Fig. 5, is a transverse section on the line 5—5 of Fig. 4. Figs. 6 and 7 show perspectives of the master key adapted for insertion in reversed directions.

The invention is intended for use in connection with that class of nut locks in which a key is inserted behind the several nuts of a fish plate and has a leaf projecting below them so as to prevent them from turning. In connection with such keys a washer is used which has one edge clipped off so that the key may reach well up behind the nut. The locking key is necessarily inserted after the nuts have been turned up and in turning them up it is necessary to prevent the washer from turning, otherwise their straight or clipped edges are not likely to be down and consequently the key cannot be inserted.

The present invention comprises a master key of the same form as the locking key except that its lower leaf is recessed or cut away, so as to admit of the free turning of the nuts, and its end is turned outwardly to form a hook for use in removing it after the nuts are in place.

In the drawings I show at A a portion of railway rail, at B an ordinary fish plate, at C the nuts; at $c$ the bolts; at D the special form of washer used on the outer bolts in connection with the class of nut locks under consideration and having a projecting end and a downward projecting lug or stop $d$ to prevent the removal of the locking key E.

At F is shown the form of washer preferably used upon the inner bolts and which, as shown are round with a piece clipped from one side so that when in place they project but slightly below the bolt $c$.

The master key is shown at G and consists of a metal bar angular in cross section, one of its leaves being somewhat thinner than washers D, F and its other leaf $g$, being as shown, thickened, increasingly from the angle of the bar to its edge so that while the outer angle of the bar is obtuse to conform to the angle of the fish plate its inner angle may be a right angle. The thickening of the lower leaf of the bar is not essential to the operation of the key, but is preferably employed.

The lower leaf of the master key G is recessed at intervals corresponding with the spacing of the bolts $c$, so that it offers no impediment to the adjustment of the nuts C the recesses being of sufficient length to provide amply for the action of the wrench. In order to prevent the master key from slipping laterally from under the nuts while they are still loose, I make the lower leaf solid a sufficient distance from its heel or curved end so that it will engage the first nut. After the other nuts have been turned up the key is withdrawn partially to bring one of its recesses below this nut, when it is turned up, and thus the key leaves all of the washers in their desired position.

One end of the master key G may be turned outwardly as shown at $g'$ for convenience in removing it. The key is ordinarily inserted from the right, but it being necessary in some situations to insert it from the left the curvature $g'$ may be at either end as shown in Figs. 6 and 7.

In use the nuts are first turned up partially on the bolts, the master key is then inserted behind them, the washers being turned to bring them right side up. The nuts are now turned up tight and secure the washers firmly. The master key is now drawn out, and this is easily accomplished as its upper leaf is thinner than the washers. The locking key may now be inserted, the master key having left all the washers with their straight edges down and in line.

I claim as my invention—

1. A master key for setting the washers on fish plate bolts, consisting of a bar of angle metal adapted to fit in the angle of the fish plate and having its lower leaf recessed to admit of the turning of the nuts, substantially as described.

2. The combination with a set of fish plate washers having one of their edges straight, of a master key consisting of a bar of angle metal adapted to fit in the angle of the fish plate and prevent the washers from turning while the nuts are being turned up and having its lower leaf recessed to admit of the turning of the nuts, substantially as described.

3. The combination with a set of fish plate washers having one of their edges straight, of a master key consisting of a bar of angle metal adapted to fit in the angle of the fish plate and prevent the washers from turning while the nuts are being turned up and having its lower leaf recessed to admit of the turning of one or more of the nuts, substantially as described.

In testimony whereof I affix my signature in presence of two witnesses.

JULIUS C. BROWN.

Witnesses:
SPENCER WARD,
LOUIS K. GILLSON.